(12) United States Patent
Arboleda et al.

(10) Patent No.: US 12,072,300 B2
(45) Date of Patent: *Aug. 27, 2024

(54) FLEXIBLE INSPECTION SYSTEM

(71) Applicant: Ford Global Technologies, LLC, Dearborn, MI (US)

(72) Inventors: Scott Arboleda, Commerce Township, MI (US); Francis Maslar, Grosse Ile, MI (US); Walter LaPlante, Bloomfield Hills, MI (US); Paul Christopher Shaw, Amherstburg (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/298,561

(22) Filed: Apr. 11, 2023

(65) Prior Publication Data

US 2023/0243759 A1    Aug. 3, 2023

Related U.S. Application Data

(63) Continuation of application No. 16/703,410, filed on Dec. 4, 2019, now Pat. No. 11,624,713.

(51) Int. Cl.
  *G01N 21/95* (2006.01)
  *B25J 9/16* (2006.01)
  *G01N 21/88* (2006.01)

(52) U.S. Cl.
  CPC ........ *G01N 21/9515* (2013.01); *B25J 9/1679* (2013.01); *G01N 21/8851* (2013.01); *G01N 2021/9518* (2013.01)

(58) Field of Classification Search
  CPC .......... G01N 21/9515; G01N 21/8851; G01N 2021/9518; B25J 9/1679
  See application file for complete search history.

(56) References Cited

U.S. PATENT DOCUMENTS

| | | | | |
|---|---|---|---|---|
| 5,528,496 A | * | 6/1996 | Brauer ................. | G01B 11/275 |
| | | | | 701/34.2 |
| 11,624,713 B2 | * | 4/2023 | Arboleda ............... | B25J 9/1679 |
| | | | | 702/82 |
| 2020/0294220 A1 | * | 9/2020 | Gonzalez Diaz ......... | G06T 7/70 |

\* cited by examiner

*Primary Examiner* — David F Dunphy
(74) *Attorney, Agent, or Firm* — Burris Law, PLLC

(57) ABSTRACT

A flexible inspection system includes a robot with a plurality of scanners and a robot controller. The robot controller is configured to receive a vehicle inspection protocol (VIP) for a vehicle being assembled on an assembly line. The VIP includes checkpoints to be scanned on the vehicle and the checkpoints correspond to components installed on the vehicle and connections between components installed on the vehicle. The robot controller commands the robot to move the plurality of scanners per the VIP such that the checkpoints are scanned. A characteristic of each checkpoint is recorded and compared to a reference characteristic such that a pass or no-pass determination of each checkpoint is provided. A vehicle inspection report with the pass/no-pass determinations is provided to an operator such that operator inspections and/or repairs of the checkpoints are made.

20 Claims, 5 Drawing Sheets

FLEXIBLE INSPECTION SYSTEM

CROSS-REFERENCE TO RELATED APPLICATION

This application is a continuation of U.S. patent application Ser. No. 16/703,410, filed Dec. 4, 2019, now U.S. Pat. No. 11,624,713. The disclosure of the above application is incorporated herein by reference.

FIELD

The present disclosure relates to inspection systems, and particularly to inspection systems used during the assembly of vehicles of motor vehicles.

BACKGROUND

The statements in this section merely provide background information related to the present disclosure and may not constitute prior art.

The assembly of motor vehicles includes a multitude of inspections. For example, the positioning and secure attachment of components installed during assembly of the vehicle and/or connections between such components are inspected to ensure proper functioning of the vehicle when assembly is complete. Also, some inspections are performed at an inspection station where a plurality of components and/or connections between components are inspected in a relatively short time frame (e.g., tens of seconds).

The present disclosure addresses issues related to inspecting vehicle components and/or connections between vehicle components in a relatively short time frame and other issues related to the inspection of vehicles.

SUMMARY

This section provides a general summary of the disclosure and is not a comprehensive disclosure of its full scope or all of its features.

In one form of the present disclosure, a method of inspecting a vehicle being assembled comprises receiving, by a robot controller, a vehicle inspection protocol (VIP) for a particular vehicle being assembled, the VIP comprising configuration information and checkpoints to be scanned on the vehicle based on the configuration information, the configuration information indicating an assigned model, one or more selected options, and one or more specific components to be installed to the particular vehicle, each checkpoint being a specific predefined area of the vehicle defined by at least one of the components installed on the vehicle and connections between the components installed on the vehicle, commanding at least one robot having at least one scanner to move the at least one scanner per the VIP for the vehicle being assembled to respective locations defined by the areas of the checkpoints such that the checkpoints are scanned and at least one characteristic of each checkpoint is recorded, and comparing, with a scanner controller, the at least one recorded characteristic of each checkpoint with at least one reference characteristic of each checkpoint.

In variations of this method, which may be implemented individually or in any combination: the VIP corresponds to a vehicle identification number (VIN) and a vehicle configuration number (VCN) for the vehicle being assembled; the plurality of checkpoints is greater than or equal to ten (10) checkpoints; scanning, with the at least one robot with the at least one scanner and the robot controller, the greater than or equal to fifty (50) checkpoints such that a vehicle inspection report (VIR) is generated in less than sixty (60) seconds; the VIR comprises a visual indicator for each scanned checkpoint, the visual indicator being a pass or no-pass indicator; displaying the VIR to an operator; the VIR displayed on the display comprises: a no-pass indicator for a checkpoint having a recorded characteristic outside a predefined tolerance of a reference characteristic; a vehicle diagram with a no-pass checkpoint marker illustrating where the checkpoint with the no-pass indicator is located on the vehicle; an image of the reference characteristic for the checkpoint; and an image of the recorded characteristic; the at least one scanner is selected from the group consisting of 2D cameras, 3D cameras, laser scanners, structured light scanners, modulated light scanners, infrared light scanners, ultraviolet light scanners, x-ray scanners, radio frequency scanners, and ultrasonic scanners; the checkpoints are selected from the group consisting of a vehicle identification number (VIN), a component bar code, a component, a connection between components, a position of a component on the vehicle being assembled, and a position of a connection between components on the vehicle being assembled; positioning the at least one robot with the at least one scanner in an inspection station of a vehicle assembly line, wherein the robot controller receives a vehicle inspection protocol (VIP) for a plurality of vehicles being assembled, the VIP comprising checkpoints to be scanned on each of the plurality of vehicles and the checkpoints corresponding to at least one of components installed on the plurality of vehicles and connections between components installed on the plurality of vehicles; visually inspecting a chassis of the vehicle in the inspection station, and assembling a body of the vehicle on the chassis of the vehicle after the inspection station; commanding, with the robot controller, the robot to move the at least one scanner per more than one hundred different VIPs for more than one hundred vehicle configurations being assembled and having different VCNs; the at least one robot with the at least one scanner comprises a first robot with a first set of scanning devices on a first side of the vehicle being assembled and a second robot with a second set of scanning devices on a second side of the vehicle being assembled; commanding, with the robot controller, the first robot with the first set of scanning devices and the second robot with the second set of scanning devices to move per the more than one hundred different VIPs; and the VIP is for a chassis of a vehicle.

Another method according to the present disclosure includes inspecting a vehicle being assembled, the method comprising receiving, with at least one robot with at least one scanner and a robot controller, receive a vehicle inspection protocol (VIP) for a particular vehicle being assembled, the VIP comprising configuration information and checkpoints to be scanned on the vehicle based on the configuration information, the configuration information indicating an assigned model, one or more selected options, and one or more specific components to be installed to the particular vehicle, each checkpoint being a specific predefined area of the vehicle defined by at least one of the components installed on the vehicle and connections between the components installed on the vehicle, commanding the robot to move the at least one scanner per the VIP for the vehicle being assembled to respective locations defined by the areas of the checkpoints such that the checkpoints are scanned and at least one visual characteristic of each checkpoint is recorded, comparing, with a scanner controller, the at least one recorded visual characteristic of each checkpoint with at least one reference visual characteristic of each checkpoint such that a vehicle inspection report (VIR) is generated, and displaying, with an operator display station, the VIR to an operator, the VIR comprising a no-pass indicator for a checkpoint having a recorded visual characteristic outside a predefined tolerance of a reference visual characteristic, a vehicle diagram with a no-pass checkpoint marker illustrating where the checkpoint with the no-pass indicator is located on the vehicle, an image of the reference visual characteristic for the checkpoint, and an image of the recorded visual characteristic.

In variations of this method, which may be implemented individually or in any combination: the VIP corresponds to a vehicle identification number (VIN) and a vehicle configuration number (VCN) for the vehicle being assembled; the plurality of checkpoints is greater than or equal to fifty (50) checkpoints; and scanning, with the at least one robot with the at least one scanner and the robot controller, the greater than or equal to fifty (50) checkpoints such that a vehicle inspection report (VIR) is generated in less than sixty (60) seconds.

In yet another method according to the present disclosure includes inspecting a vehicle being assembled, the method comprising: receiving, with at least one robot with a plurality of scanners and a robot controller, a vehicle inspection protocol (VIP) for a particular vehicle being assembled, the VIP comprising configuration information and more than fifty (50) checkpoints to be scanned on the vehicle based on the configuration information, the configuration information indicating an assigned model, one or more selected options, and one or more specific components to be installed to the particular vehicle, each of the more than fifty (50) checkpoints being a specific predefined area of the vehicle defined by the components installed on the vehicle and connections between the components installed on the vehicle; commanding the robot to move the plurality of scanners per the VIP for the vehicle being assembled to respective locations defined by the areas of the more than fifty (50) checkpoints such that the more than more than fifty (50) checkpoints are scanned and at least one visual characteristic of each checkpoint is recorded in a time frame of less than sixty (60) seconds; comparing, with a scanner controller, the at least one recorded visual characteristic of each of the more than fifty (50) checkpoints with at least one reference visual characteristic of each of the more than fifty (50) checkpoints and generate a vehicle inspection report (VIR); and displaying, with an operator display station spaced apart from the visual inspection station, the VIR to an operator, the VIR comprising: a no-pass indicator for each of the more than fifty checkpoints having a recorded visual characteristic outside a predefined tolerance of a reference visual characteristic; a vehicle diagram with a no-pass checkpoint marker illustrating where each no-pass checkpoint is located on the vehicle; an image of the reference visual characteristic for each of the more than fifty checkpoints; and an image of the recorded visual characteristic for each of the more than fifty checkpoints having a recorded visual characteristic outside a predefined tolerance of a corresponding reference visual characteristic.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 4A is a flow chart for providing a Vehicle Inspection Protocol (IP) to the NCI station in FIG. 1; and FIG. 4B is a flow chart for providing a Vehicle Inspection Report (VIR) to the OD station in FIG. 1.

Figure 1:
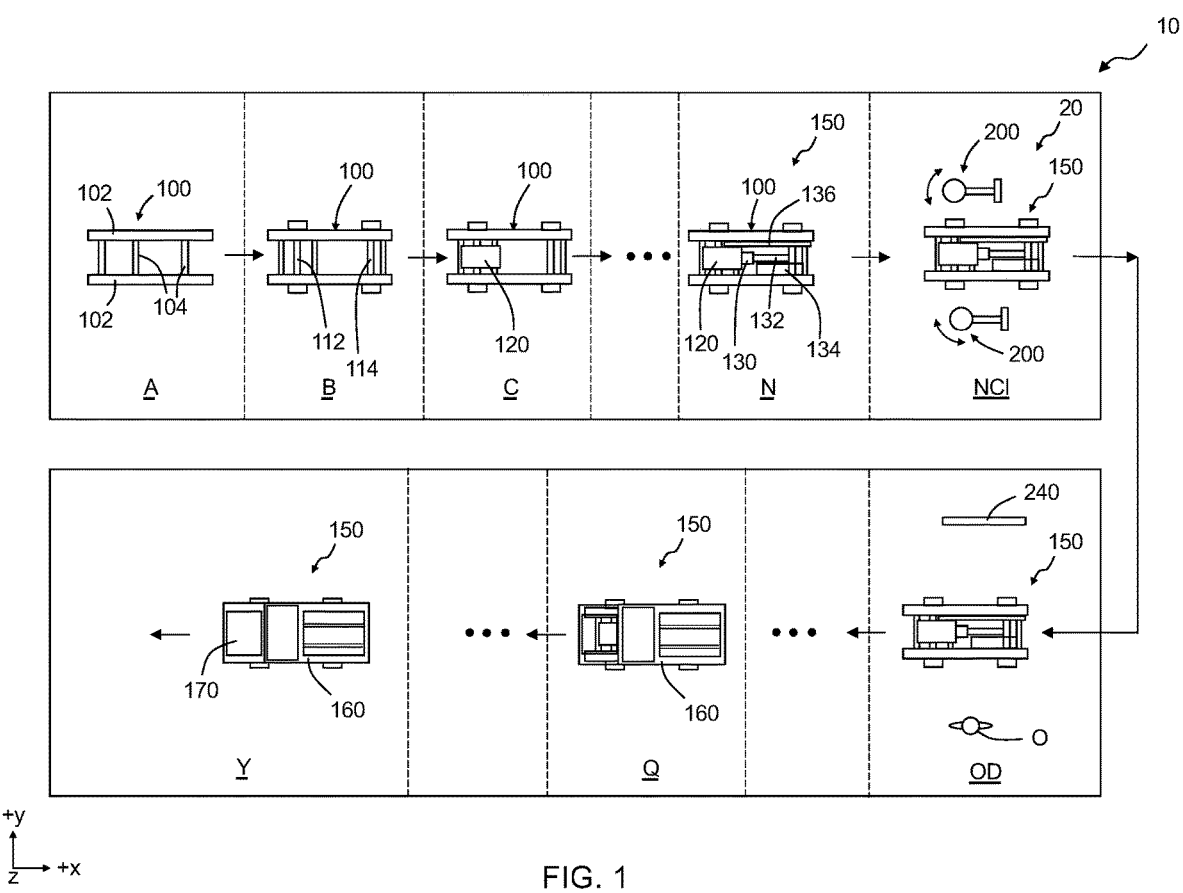
FIG. 1 is a top view of an assembly line with a no-contact inspection (NCI) station and an operator display (OD) station according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, an assembly line 10 with a flexible inspection (FI) system 20 according to one form of the present disclosure is shown. In the example shown in FIG. 1, the assembly line 10 includes a plurality of assembly stations such as station 'A' where a vehicle frame 100 with a pair of main frame members 102 and a plurality of cross-members 104 extending between the main frame members 102 are shown. It should be understood that the frame 100 shown at station A can be assembled at station A, or in the alternative, arrive at station A already assembled. The assembly line 10 also includes station 'B' where a front axle 112 and a rear axle 114 are mounted onto the frame 100 and station 'C' where an engine 120, e.g., a gasoline engine or a diesel engine, is mounted to the frame 100.

The frame 100 moves through a plurality of additional stations as indicated in FIG. 1 until arriving at station 'N' where a chassis 150 of a vehicle has been assembled. In the example shown in FIG. 1 the chassis 150 includes the frame 100, the engine 120, a transmission 130, a drive shaft 132, a fuel tank 134 and an exhaust 136. It should be understood that the chassis 150 can include other or additional components than noted above before moving to a no-contact inspection 'NCI' station where the FI system 20 is located. In the alternative, the chassis 150 can include less or fewer components than noted above before moving to a no-contact inspection 'NCI' station. Non-limiting examples of other components include electrical lines, electrical connectors, wire harnesses, wire harness connectors, fuel line(s), fuel line connectors, brake lines, brake line connectors, heating and/or air conditioning lines, heating and/or air conditioning line connectors, among others. As used herein, the phrase "no-contact inspection" refers to inspection via electromagnetic radiation scanning and/or ultrasound scanning with an electronic device. In some variations of the present disclosure the no-contact inspection is a "visual inspection" which refers to herein as inspection via optical scanning with an electronic device such as a 2D camera, a 3D camera, a laser scanner, structured light scanner and modulated light scanner, among others.

The FI system 20 scans a plurality of chassis checkpoints in or at the NCI station and a plurality of characteristics of the checkpoints is recorded. As used herein, the term "checkpoint" refers to a specific and predefined area of the chassis 150 to be scanned or that is scanned by the FI system 20 for the purpose of recording at least one characteristic of the scanned area. In variations where the no-contact inspection is a visual inspection, the at least one characteristic is at least one visual characteristic. Non-limiting examples of checkpoints include areas where a component is assembled on the chassis 150 and areas with one or more electrical connectors, fuel line push connectors, popp clamps, wire harnesses, brake retainer clips, bar codes and combinations thereof, among others. After the chassis 150 is scanned by the FI system 20, the chassis 150 moves to an operator display 'OD' station with a display 240. In some variations of the present disclosure the OD station is spaced apart from the NCI station. For example, in at least one variation the NCI station is located in a first chassis assembly line with no operators present in the NCI station and the OD station is located in a second chassis assembly line with at least one operator present in the OD station.

In some variations of the present disclosure the chassis 150 moves from the OD station through additional assembly line stations until assembly of the vehicle is completed. In the example shown in FIG. 1, the chassis moves through a station 'Q' where a body 160 is mounted to the chassis 150 and station 'Y' where a hood 170 is mounted to the body 160. It should be understood that one or more additional inspection stations can be included in the assembly line 10 and such inspections stations can include a flexible inspection system according to the teachings of the present disclosure.

Figure 2:
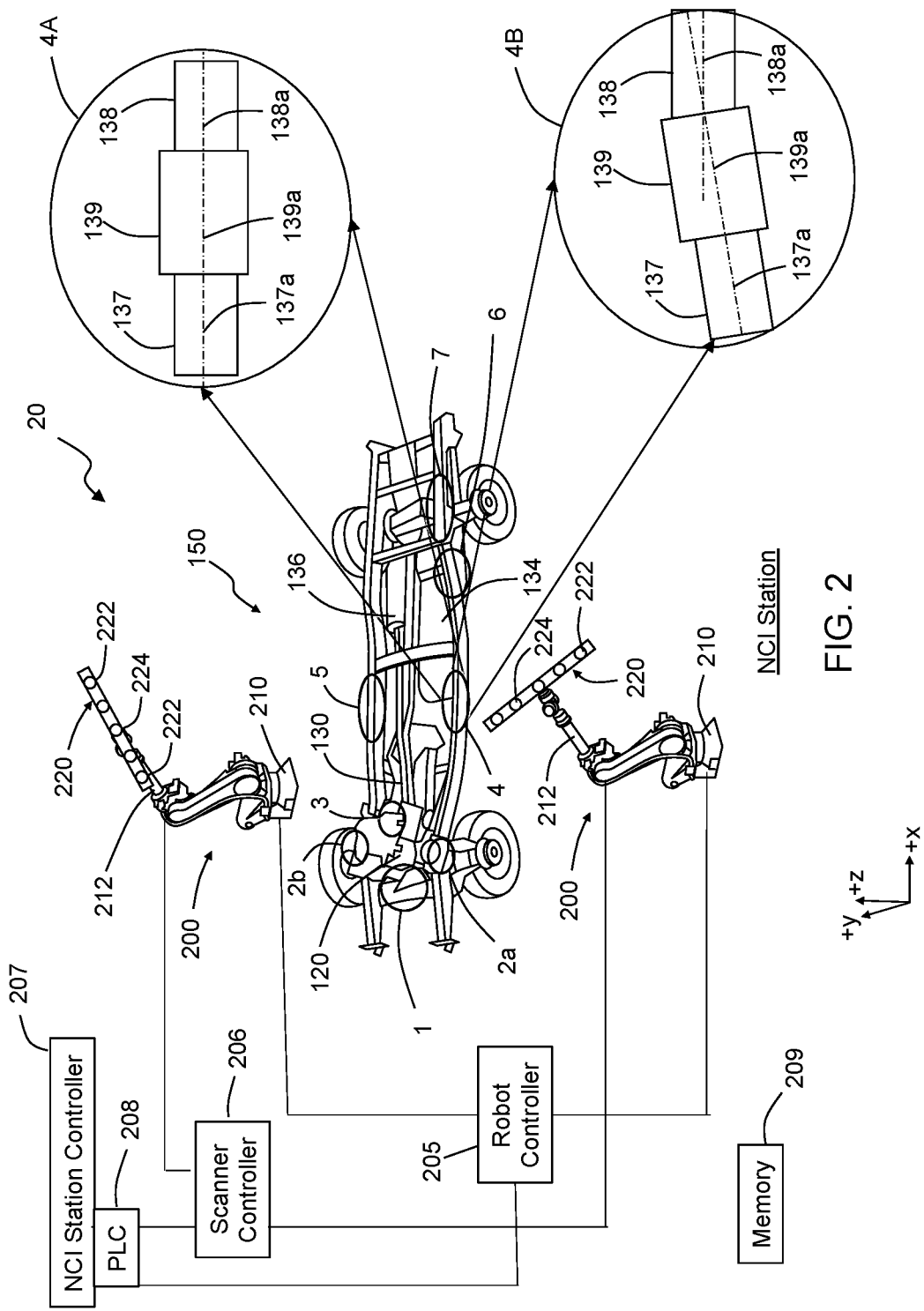
FIG. 2 is an enlarged perspective view of the NCI station in FIG. 1.

Referring now to FIG. 2, an enlarged perspective view of the NCI station with the FI system 20 is shown. The FI system 20 includes at least one robot 200 with a scanner assembly 220, a robot controller 205 in communication with the at least one robot 200, and a scanner controller 206 in communication with each scanner assembly 220. In at least one variation the FI system 20 and/or NCI station includes an NCI station controller 207 and a program logic controller (PLC) 208 in communication with the robot controller 205 and/or the scanner controller 206. While FIG. 2 shows the NCI station controller 207 and the PLC 208 as separate controllers, in some variations the NCI station controller 207 and the PLC 208 are the same controller. In at least one variation, memory 209 is included and in communication with the scanner controller 206 and/or NCI station controller 207. In some variations of the present disclosure, the FI system 20 includes a first robot 200 located or positioned on one side of the chassis 150 (e.g., on a driver side, −y direction) and a second robot 200 located or positioned on another side of the chassis 150 (e.g., on a passenger side, +y direction). Each of the robots 200 includes a base 210 and an arm 212 with at least three degrees of movement (e.g., x, y, z directions). While the example shown in FIG. 2 shows the base 210 of the robots 200 on a floor (not labeled) of the NCI station, i.e., the robots 200 are mounted to the floor, it should be understood that the robots 200 can be mounted to a wall (not shown) of the NCI station and/or a roof structure (not shown) of the NCI station.

The scanner assembly 220 includes at least one scanning device 222 (also referred to herein simply as a "scanner"), e.g., a plurality of scanners 222. In at least one variation of the present disclosure the at least one scanner 222 is a visual scanner and the scanner assembly 220 is a visual scanner assembly 220. In some variations a visual scanner assembly 220 includes one or more illumination devices 224 to provide light to checkpoints being scanned by the visual scanner assembly 220. Non-limiting examples of the scanners 222 include 2D cameras, 3D cameras, laser scanners, structured light scanners, modulated light scanners, infrared light scanners, ultraviolet light scanners, x-ray scanners, radio frequency scanners, and ultrasonic scanners, among others.

In some variations, the robot controller 205 is a single robot controller that commands and controls both of the robots 200 as shown in FIG. 2. In other variations, each of the robots 200 has a robot controller 205. Similarly, in some variations the scanner controller 206 is a single scanner controller that commands and controls both of the scanner assemblies 220 as shown in FIG. 2. In other variations, each of the scanner assemblies 220 has a scanner controller 206.

In at least one variation the NCI station controller 207 is configured to provide VIP information to the robot controller 205 and/or the scanner controller 206. Also, in some variations the NCI station controller 207 receives inspection (i.e., scanned) information from the scanner controller 206. The robot controller(s) 205 is/are configured to command the robots 200 to move the scanner assembly 220 and the scanner controller 206 is configured to command the scanner assemblies 220 such that a plurality of checkpoints are scanned and characteristics of the scanned checkpoints are recorded. In the example shown in FIG. 2, the robot controller(s) 205 is/are configured to command the robots 200 such that the scanner assemblies 220 move past and proximate to a checkpoint '1' where air conditioner (NC) lines are routed and pop clamps have been used to connect two or more NC lines, and checkpoints '2a', '2b' where anti-lock braking system (ABS) connectors are located. Also, the robot controller(s) 205 is/are configured to command the robots 200 such that the scanner assemblies 220 move past and proximate to a checkpoint '4' where a fuel line connection is located, a checkpoint '5' where a VIN stamp on the frame member 102 is located, a checkpoint '6' where a fuel tank, fuel tank filler neck and vapor line connections are located, and a checkpoint '7' where a wire harness and brake line clips are located. Similarly, the scanner controller 206 is configured to command the scanner assembly 220 such that at least one characteristic from the checkpoints 1-7 is scanned and recorded by at least one scanner 222. While FIG. 2 shows seven checkpoints, it should be understood that the FI system 20 can be configured to scan and evaluate less than seven checkpoints or more than seven checkpoints, for example more than ten checkpoints, more than twenty checkpoints, more than thirty checkpoints, more than forty checkpoints, more than fifty checkpoints, more than sixty checkpoints, more than 70 checkpoints, more than one hundred checkpoints, more than five hundred checkpoints, and more than one thousand checkpoints. Also, the at least one recorded characteristic at each checkpoint is compared to a corresponding reference characteristic of each checkpoint as described in more detail below.

Still referring to FIG. 2, one example of a desired connection in a fuel line is shown at inset 4A and one example of an undesired connection in the fuel line is shown at inset 4B. Particularly, inset 4A shows a first fuel line section 137 with an axis 137a, a second fuel line section 138 with an axis 138a and a connecter 139 with an axis 139a all aligned along a single axis. In the example shown in inset 4A, the alignment of the axes 137a, 138a and 139a along the single axis demonstrates or indicates a desired or "pass" connection between the fuel line sections 137 and 138. In contrast, inset 4B shows the axis 137a of the first fuel line section 137 and the axis 139a of the connector 139 are not aligned with the axis 138a of the second fuel line section 138a, thereby indicating that the first fuel line section 137 is not properly aligned and connected to the second fuel line section 138.

That is, a comparison of the alignment (i.e., misalignment) of the axes in inset 4B (e.g., a recorded visual characteristic) to the alignment of axes in inset 4A (e.g., a reference visual characteristic) shows an improper or "no-pass" connection between the first fuel line section 137 and the second fuel line section 138. It should be understood that other types of comparisons between and a reference characteristic and a recorded characteristic are included in the teachings of the present disclosure. Non-limiting examples of such comparisons include comparisons of at least one reference characteristic and at least one recorded characteristic of bar codes, histograms, feature extraction, multiple view geometry, dense reconstruction, object recognition, pattern matching, pixel counting, blob counting, edge detection, among others. In addition, it should be understood that when such a comparison is within a predetermined or predefined tolerance the checkpoint can be deemed or determined to pass inspection and when such a comparison is not within a predetermined or predefined tolerance the checkpoint can be deemed or determined to not pass inspection. A predetermined or predefined tolerance as used herein refers to being within a certain percentage (e.g. 10%) of a reference histogram, feature extraction, multiple view geometry, dense reconstruction, object recognition, pattern matching, pixel counting, blob counting, edge detection, among others, of a reference characteristic as determined by analysis techniques or methods such as six sigma, regression analysis, least squares, among others.

Figure 3:
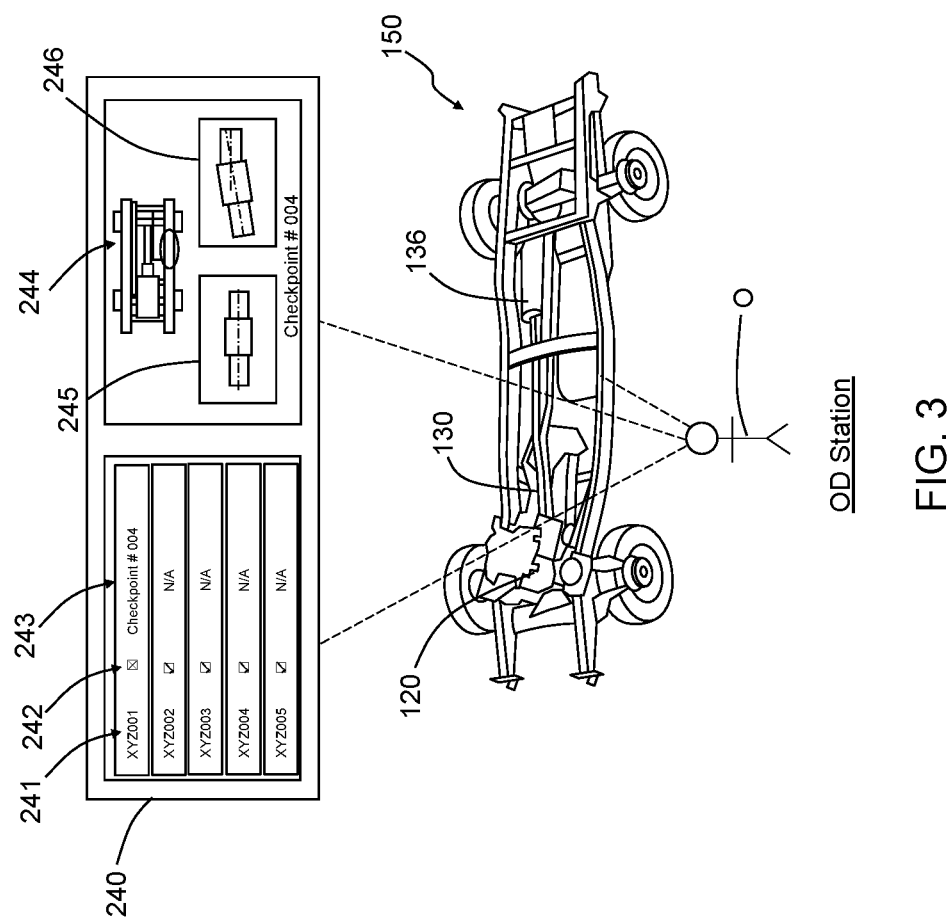
FIG. 3 is an enlarged perspective view of the OD station in FIG. 1.

Referring now to FIG. 3, an enlarged perspective view of the OD station with the display 240 is shown. In the example shown in FIG. 3, a chassis 150 inspected at the NCI station in FIG. 2 has moved to and is in the OD station. An operator 'O' is in the OD station and the display 240 is in the line of sight of the operator O. In some variations of the present disclosure the display 240 displays a chassis number (e.g., a VIN) at 241 for a chassis in the OD station and/or one or more chassis that will enter the OD station, a pass/no-pass indicator at 242, and a checkpoint number for a no-pass indicator at 243. In the example shown in FIG. 3, chassis number XYZ001 is currently in the OD station, a no-pass indicator is shown at 242 and the location of the no-pass inspection (checkpoint 4) is shown at 243. Accordingly, the operator O is alerted that possible alignment, repair or replacement of a component and/or connection is needed at checkpoint 4.

In some variations the display 240 provides a visual aid or guide to the operator O for a possible alignment, repair or replacement of a component and/or connection. For example, FIG. 3 shows a vehicle diagram of the chassis 150 with the checkpoint 4 circled at 244, a reference visual characteristic (e.g., a digital image) of the fuel line section at checkpoint 4 at 245, and a recorded (actual) visual characteristic (e.g., a digital image) of the fuel line section at checkpoint 4 at 246. It should be understood that upon viewing the display 240, the operator O visually sees: (1) a 'no-pass' inspection has occurred at checkpoint 4 for chassis XYZ001; (2) where checkpoint 4 is located on the chassis 150; (3) what the reference visual characteristic (e.g., a digital image) for checkpoint 4 looks like; and (4) what the recorded (actual) visual characteristic of checkpoint 4 looks like. Accordingly, the operator O can inspect the fuel line section at checkpoint 4 and determine whether or not corrective action is needed, and if needed, take such corrective action before the chassis 150 moves to another station (e.g., station Q) and additional components (e.g., body 160) are assembled on the chassis 150.

Figure 4A:
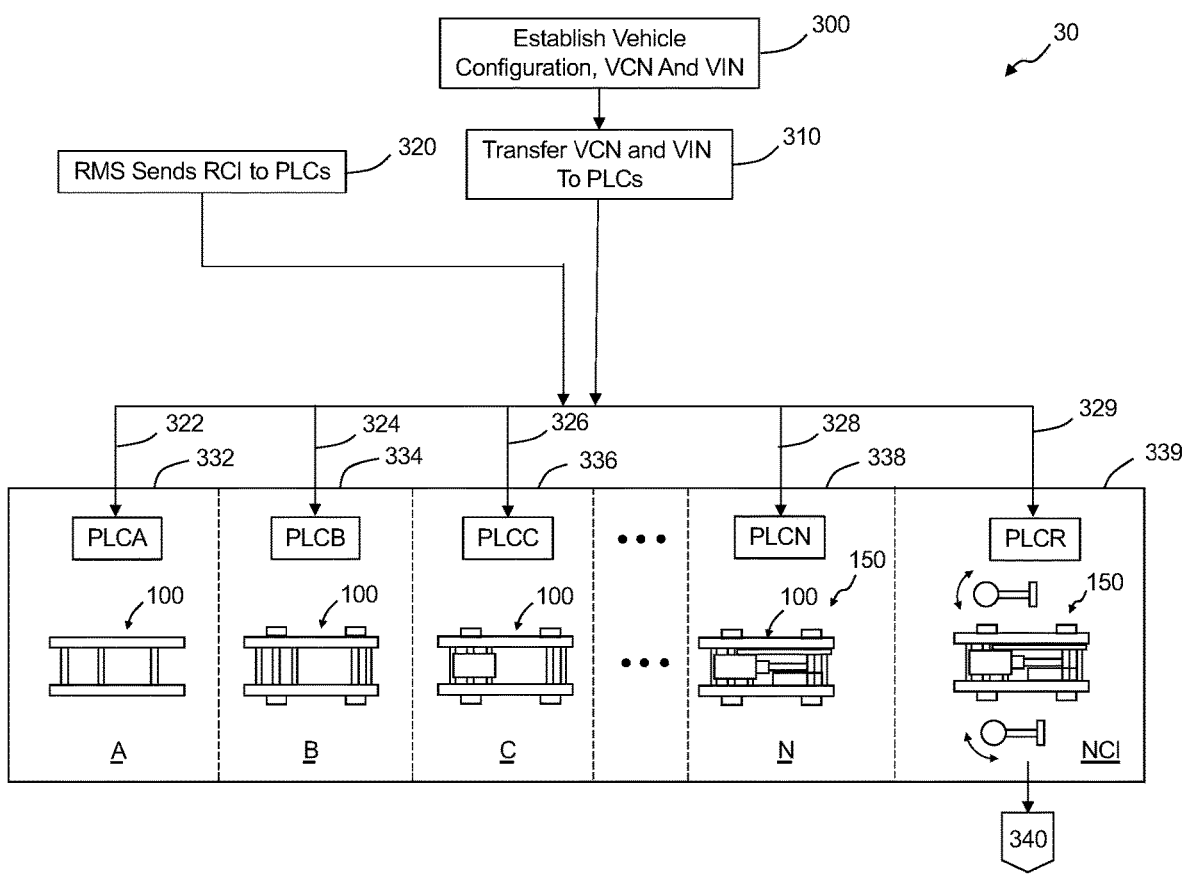
FIGS. 4A and 4B are flow charts for a method of inspecting a vehicle where.
Figure 4B:
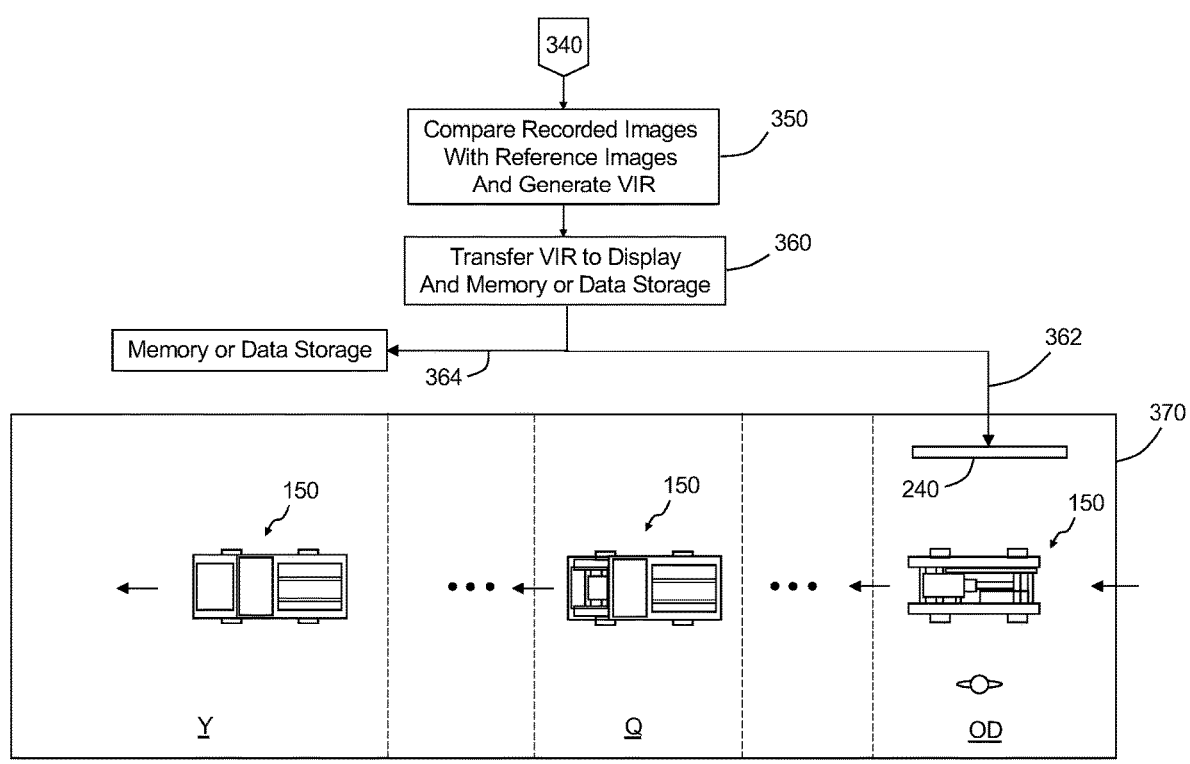

Referring now to FIGS. 4A and 4B, a flowchart for a method 30 of using the FI system 20 is shown with the stations of the assembly line 10 included to assist in teaching the method 30. The method 30 includes establishing a vehicle configuration, a vehicle configuration number (VCN) and a vehicle identification number (VIN) at 300. As used herein the phrase "vehicle configuration" refers to an assigned model and selected options for a particular vehicle. For example, and for illustrative purposes only, the frame and chassis represented in FIGS. 1-3 is for a truck with chassis number XYZ001 and options selected from two-wheel drive or four-wheel drive, six different frame lengths, six different engines, two different transmissions, twelve different fuel tanks, and five different fuel necks. Accordingly, a vehicle configuration for chassis number XYZ001 being assembled (and for any particular chassis) on the assembly line 10 is the particular wheel drive, frame length, engine, transmission, fuel tank and fuel neck selected for chassis number XYZ001. Also, the VCN for chassis number XYZ001 identifies the vehicle configuration for chassis number XYZ001 being assembled on the assembly line 10. Stated differently, when a truck is ordered by a customer, the truck and its options correspond to a particular vehicle configuration and the VCN is a number or code that is unique to that particular vehicle configuration. Accordingly, the VCN dictates or determines which frame length, engine, transmission, fuel tank, fuel neck, among others is assembled on the assembly line 10. It should be understood that the VIN is an identifying code for a specific vehicle and that no two vehicles in operation have the same VIN.

After the VCN and VIN have been established at 300, the VCN and VIN are transferred to program logic controllers PLCs for the assembly line 10 at 310. In addition, a recipe management system (RMS) transfers or has previously transferred recipe configuration information (RCI) to program logic controllers (PLCs) at each of the stations A, B, C, N, NCI at 320. It should be understood that the PLCs use the RCI to interpret the VCN and create an assembly protocol (recipe) at stations A, B, C, N, and a vehicle inspection protocol (VIP) for the robot controller 205 and/or scanner controller 206 on the assembly line 10. As used herein, the phrase "vehicle configuration information" refers to configuration information for a particular vehicle at a particular assembly line station (e.g., which engine 120 is to be assembled on the frame 100 of the vehicle at station C (FIG. 1) and/or instructions on assembling the appropriate engine 120 on the frame 100 at station C). Also, the phrase "vehicle inspection protocol" as used herein refers to a particular inspection for a vehicle having a particular VCN (e.g., which components and/or connections between components are to be scanned with the scanner assembly 220 (FIG. 2)).

In the example shown in FIG. 4A, the VCN is transferred to PLCA (station A) at 322, to PLCB (station B) at 324, to PLCC (station C) at 326, to PLCN (station N) at 328, and to PLCR (station NCI) at 329. At 332 the PLCA generates a recipe for one or more devices (e.g., a robot, welding machine, sealing machine, among others) to perform one or more assembly tasks at station A. Also, at 334, 336, and 338, the PLCB, PLCC, and PLCN, respectively, generate recipes for stations B, C, and N, respectively, for one or more devices to perform assembly tasks such that chassis 150 is assembled before it moves to the NCI station. It should be understood that one or more operators (i.e., individuals) can perform one or more operations at each of the stations A, B, C, N to assist in the assembly of the chassis 150.

At 339 the PLCR generates a VIP, i.e., an inspection recipe, and transfers the VIP to the robot controller 205 and scanner controller 206 (FIG. 2). The robot controller 205 commands the robots 200 (FIG. 2) and the scanner controller 206 commands the scanner assemblies 220 (FIG. 2) such that the scanner assemblies 220 scan checkpoints and record at least one characteristic at each checkpoint. That is, given that the VCN of each vehicle corresponds to a specific configuration of that particular or specific vehicle (e.g., a particularly or specific frame length, engine, transmission, fuel tank, and fuel neck, among others), the checkpoints for inspection change from vehicle-to-vehicle and such changes are accounted for by the VIP transferred to the robot controller 205 and/or scanner controller 206. In some variations of the present disclosure, the VIP includes a path of robot movement (i.e., scanner assembly 220 movement) that is dependent on the engine, transmission and frame length, among others, of the chassis 150 in the NCI station. In at least one variation, the VIP includes a visual inspection sequence that determines or commands the order of scanning the checkpoints, which scanner 220 is used for scanning a particular checkpoint, what type of scan is taken of a particular checkpoint and/or what type of analysis is performed on a scan of a particular checkpoint. Non-limiting examples of the types of scans include 2D camera scans, 3D camera scans, laser scans, structured light scans, modulated light scans, x infrared scans, ultraviolet light scanners, x-ray scanners, radio frequency scanners, ultrasonic scanners, and combinations thereof, among others, and non-limited examples of scan analyses include analyses of histograms, feature extractions, multiple view geometries, dense reconstructions, object recognitions, pattern matchings, pixel countings, blob countings, edge detections, among others.

During and/or after the VIP is executed at 339, the scanner controller 206 generates or creates a vehicle inspection report (VIR) at 350 (FIG. 4B) where the recorded characteristics of the scanned checkpoints are compared to reference characteristics of corresponding checkpoints such that a pass or no-pass indicator is provided for each scanned checkpoint. The VIR is transferred to the display 240 in the OD station and memory or data storage at 360. For example, in some variations the VIR is stored in memory 209 (FIG. 2) for review and/or analysis at a later time. In the example shown in FIG. 4B, the VIR is transferred to the display 240 at 362 and transferred to memory or data storage at 364. At 370 the VIR for a particular vehicle, or some portion of the VIR, is displayed on the display 240 when the particular vehicle is in the OD station and the operator 0 inspects any no-pass checkpoints determined by the FI system 20. It should be understood that inspecting and repairing any no-pass checkpoints at the OD station enhances the assembly of vehicles on the assembly line 10. In the example shown in FIGS. 1-4B, the inspection, correction and/or repair of components, positioning of components, connections between components, among others, at the NCI inspection before the body 160 is assembled to the chassis 150 reduces labor and time needed for such correction and/or repair compared to after the body 160 is assembled to the chassis 150.

While FIGS. 1-4B show a chassis being assembled and inspected, it should be understood that the FI system and method of using the FI system disclosed herein can be used for inspection of powertrains for vehicles. Also, the FI system and the method of using the FI system disclosed herein are not limited to the inspection of vehicles and can be used for the inspection of any component components and/or assembly of components produced on an assembly line.

It should also be understood from the teachings of the present disclosure that a FI system and a method of automated inspection of vehicles on an assembly line is provided. The FI system provides a unique VIP for each vehicle being assembled on an assembly line even though hundreds and even thousands of different vehicle configurations are assembled on the assembly line. In addition, each VIP is executed by the FI system in a short time frame (e.g., less than 30 seconds) such that assembly of vehicles on the assembly line proceeds with enhanced inspection and without delays. The FI system also provides a VIR that is displayed to an operator in an OD station with information on any no-pass checkpoints such as misalignments, incorrect components, incorrect positions and/or incorrect connections that have occurred during assembly of a vehicle. The VIR assists or enhances the correction or repair at such checkpoints by providing (displaying) one or more visual indicators to the operator that show a location of a no-pass checkpoint, an actual scanned image of the no-pass checkpoint, and a reference (correct) scanned image of the checkpoint. Such a display to the operator provides a clear "picture" of where the no-pass checkpoint is located on the vehicle, what the no-pass checkpoint looks like when scanned, and what the no-pass checkpoint should look like.

In this application, the term "controller" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The phrase "flexible inspection system" refers to a system that adapts to differently configured components on an assembly line such that the components are inspected without delay of the assembly line and without changing of inspection devices and/or scanning devices to scan and inspect the components having different configurations.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of inspecting a vehicle being assembled, the method comprising:
    receiving, by a robot controller, a vehicle inspection protocol (VIP) for a particular vehicle being assembled, the VIP comprising configuration information and checkpoints to be scanned on the vehicle based on the configuration information, the configuration information indicating an assigned model, one or more selected options, and one or more specific components to be installed to the particular vehicle, each checkpoint being a specific predefined area of the vehicle defined by at least one of the components installed on the vehicle and connections between the components installed on the vehicle;
    commanding at least one robot having at least one scanner to move the at least one scanner per the VIP for the vehicle being assembled to respective locations defined by the areas of the checkpoints such that the checkpoints are scanned and at least one characteristic of each checkpoint is recorded; and
    comparing, with a scanner controller, the at least one recorded characteristic of each checkpoint with at least one reference characteristic of each checkpoint.

2. The method according to claim 1, wherein the VIP corresponds to a vehicle identification number (VIN) and a vehicle configuration number (VCN) for the vehicle being assembled.

3. The method according to claim 1, wherein the checkpoints are greater than or equal to ten (10) checkpoints.

4. The method according to claim 3, further comprising scanning, with the at least one robot with the at least one scanner and the robot controller, the greater than or equal to fifty (50) checkpoints such that a vehicle inspection report (VIR) is generated in less than sixty (60) seconds.

5. The method according to claim 4, wherein the VIR comprises a visual indicator for each scanned checkpoint, the visual indicator being a pass or no-pass indicator.

6. The method according to claim 5 further comprising displaying the VIR to an operator.

7. The method according to claim 6, wherein the VIR displayed on the display comprises:
    a no-pass indicator for a checkpoint having a recorded characteristic outside a predefined tolerance of a reference characteristic;
    a vehicle diagram with a no-pass checkpoint marker illustrating where the checkpoint with the no-pass indicator is located on the vehicle;
    an image of the reference characteristic for the checkpoint; and
    an image of the recorded characteristic.

8. The method according to claim 1, wherein the at least one scanner is selected from the group consisting of 2D cameras, 3D cameras, laser scanners, structured light scanners, modulated light scanners, infrared light scanners, ultraviolet light scanners, x-ray scanners, radio frequency scanners, and ultrasonic scanners.

9. The method according to claim 1, wherein the checkpoints are selected from the group consisting of a vehicle identification number (VIN), a component bar code, a component, a connection between components, a position of a component on the vehicle being assembled, and a position of a connection between components on the vehicle being assembled.

10. The method according to claim 1, further comprising positioning the at least one robot with the at least one scanner in an inspection station of a vehicle assembly line, wherein the robot controller receives a vehicle inspection protocol (VIP) for a plurality of vehicles being assembled, the VIP comprising checkpoints to be scanned on each of the plurality of vehicles and the checkpoints corresponding to at least one of components installed on the plurality of vehicles and connections between components installed on the plurality of vehicles.

11. The method according to claim 10, further comprising visually inspecting a chassis of the vehicle in the inspection station, and assembling a body of the vehicle on the chassis of the vehicle after the inspection station.

12. The method according to claim 11, further comprising commanding, with the robot controller, the robot to move the at least one scanner per more than one hundred different VIPs for more than one hundred vehicle configurations being assembled and having different VCNs.

13. The method according to claim 12, wherein the at least one robot with the at least one scanner comprises a first robot with a first set of scanning devices on a first side of the vehicle being assembled and a second robot with a second set of scanning devices on a second side of the vehicle being assembled.

14. The method according to claim 13, further comprising commanding, with the robot controller, the first robot with the first set of scanning devices and the second robot with the second set of scanning devices to move per the more than one hundred different VIPs.

15. The method according to claim 1, wherein the VIP is for a chassis of a vehicle.

16. A method of inspecting a vehicle being assembled, the method comprising:
    receiving, with at least one robot with at least one scanner and a robot controller, receive a vehicle inspection protocol (VIP) for a particular vehicle being assembled, the VIP comprising configuration information and checkpoints to be scanned on the vehicle based on the configuration information, the configuration information indicating an assigned model, one or more selected options, and one or more specific components to be installed to the particular vehicle, each checkpoint being a specific predefined area of the vehicle defined by at least one of the components installed on the vehicle and connections between the components installed on the vehicle;

commanding the robot to move the at least one scanner per the VIP for the vehicle being assembled to respective locations defined by the areas of the checkpoints such that the checkpoints are scanned and at least one visual characteristic of each checkpoint is recorded;

comparing, with a scanner controller, the at least one recorded visual characteristic of each checkpoint with at least one reference visual characteristic of each checkpoint such that a vehicle inspection report (VIR) is generated; and displaying, with an operator display station:
   the VIR to an operator, the VIR comprising:
      a no-pass indicator for a checkpoint having a recorded visual characteristic outside a predefined tolerance of a reference visual characteristic;
      a vehicle diagram with a no-pass checkpoint marker illustrating where the checkpoint with the no-pass indicator is located on the vehicle;
      an image of the reference visual characteristic for the checkpoint; and
      an image of the recorded visual characteristic.

17. The method according to claim 16, wherein the VIP corresponds to a vehicle identification number (VIN) and a vehicle configuration number (VCN) for the vehicle being assembled.

18. The method according to claim 16, wherein the checkpoints are greater than or equal to fifty (50) checkpoints.

19. The method according to claim 18, further comprising scanning, with the at least one robot with the at least one scanner and the robot controller, the greater than or equal to fifty (50) checkpoints such that a vehicle inspection report (VIR) is generated in less than sixty (60) seconds.

20. A method of inspecting a vehicle being assembled, the method comprising:
   receiving, with at least one robot with a plurality of scanners and a robot controller, a vehicle inspection protocol (VIP) for a particular vehicle being assembled, the VIP comprising configuration information and more than fifty (50) checkpoints to be scanned on the vehicle based on the configuration information, the configuration information indicating an assigned model, one or more selected options, and one or more specific components to be installed to the particular vehicle, each of the more than fifty (50) checkpoints being a specific predefined area of the vehicle defined by the components installed on the vehicle and connections between the components installed on the vehicle;

commanding the robot to move the plurality of scanners per the VIP for the vehicle being assembled to respective locations defined by the areas of the more than fifty (50) checkpoints such that the more than more than fifty (50) checkpoints are scanned and at least one visual characteristic of each checkpoint is recorded in a time frame of less than sixty (60) seconds;

comparing, with a scanner controller, the at least one recorded visual characteristic of each of the more than fifty (50) checkpoints with at least one reference visual characteristic of each of the more than fifty (50) checkpoints and generate a vehicle inspection report (VIR); and displaying, with an operator display station spaced apart from a visual inspection station, the VIR to an operator, the VIR comprising:
   a no-pass indicator for each of the more than fifty checkpoints having a recorded visual characteristic outside a predefined tolerance of a reference visual characteristic;
   a vehicle diagram with a no-pass checkpoint marker illustrating where each no-pass checkpoint is located on the vehicle;
   an image of the reference visual characteristic for each of the more than fifty checkpoints; and
   an image of the recorded visual characteristic for each of the more than fifty checkpoints having a recorded visual characteristic outside a predefined tolerance of a corresponding reference visual characteristic.

\* \* \* \* \*